United States Patent
Chirashnya et al.

(10) Patent No.: US 6,598,179 B1
(45) Date of Patent: Jul. 22, 2003

(54) TABLE-BASED ERROR LOG ANALYSIS

(75) Inventors: Igor Chirashnya, Haifa (IL); Doron Erblich, Haifa (IL); Raanan Gewirtesman, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/540,477

(22) Filed: Mar. 31, 2000

(51) Int. Cl.[7] ................................................. G06F 11/00
(52) U.S. Cl. ............................... 714/37; 714/19; 714/20
(58) Field of Search ........................... 714/33, 37, 49, 714/26, 57, 45, 38

(56) References Cited

U.S. PATENT DOCUMENTS

| | | | |
|---|---|---|---|
| 4,633,467 A | 12/1986 | Abel et al. | |
| 4,964,125 A | 10/1990 | Kim | |
| 5,155,731 A | * 10/1992 | Yamaguchi | 714/45 |
| 5,214,653 A | 5/1993 | Elliott, Jr. et al. | |
| 5,463,768 A | 10/1995 | Cuddihy et al. | |
| 5,469,463 A | * 11/1995 | Polich et al. | 714/20 |
| 6,343,236 B1 | * 1/2002 | Gibson et al. | 700/79 |
| 6,345,322 B1 | * 2/2002 | Humphrey | 710/38 |
| 6,415,395 B1 | * 7/2002 | Varma et al. | 714/37 |

* cited by examiner

*Primary Examiner*—Robert Beausoliel
*Assistant Examiner*—Christopher McCarthy
(74) *Attorney, Agent, or Firm*—Darby & Darby

(57) ABSTRACT

A method for diagnosing faults in a computer-based system. A log of errors of different kinds that have been recorded in the system is read, and errors of those kinds that are relevant to one or more predetermined types of faults that can occur in the system are selected from the log. The selected errors are filtered so as to compose one or more events, each event comprising one or more occurrences of one or more of the relevant kinds of the errors. The composed events are analyzed to reach an assessment that at least one of the predetermined types of faults has occurred.

24 Claims, 4 Drawing Sheets

TABLE-BASED ERROR LOG ANALYSIS

FIELD OF THE INVENTION

The present invention relates generally to diagnosis of fault conditions in computer systems, and specifically to fault diagnosis using error log analysis.

BACKGROUND OF THE INVENTION

Because of the increasing complexity of computers and computer-based systems, system administrators and maintenance personnel generally do not have sufficient knowledge and expertise to diagnose all of the faults that can occur in these systems. A variety of diagnostic tools have been developed in order to help in identifying the cause of such faults and determining the corrective action that must be taken. These tools generally receive and analyze error reports from different system components. In its most basic embodiments, the analysis is based on simple, pre-programmed "if-then" rules. More sophisticated tools have been developed that use techniques such as artificial intelligence, expert systems, neural networks and inference engines. Tools of this sort are described, for example, in U.S. Pat. Nos. 4,633,467, 4,964,125 and 5,214,653, whose disclosures are incorporated herein by reference.

In many computer systems, a system error log stores a record of all of the error reports that are received from system components. The error log is supposed to be used by the system administrator or maintenance engineer in tracing and understanding faults that have occurred. The number of errors in the log can be very large, however, and with the exception of a few patterns that the system administrator may recognize from experience, the error log generally provides no clue as to the source of the error or how to solve it. At best, an enterprising system administrator may be able to find faults that are relatively straightforward by looking up error codes from the error log in a system maintenance manual. In more complex cases, the system administrator may not even be able to determine whether the entries in the error log are due to a hardware fault or to a software problem.

U.S. Pat. No. 5,463,768, whose disclosure is incorporated herein by reference, describes a method and system for automatic error log analysis. A training unit receives historical error logs, generated during abnormal operation or failure of machines of a given type, together with the actual repair solutions that were applied to fix the machines in these circumstances. The training unit identifies and labels sections, or blocks, within the error logs that are common to multiple occurrences of a given fault. These blocks are assigned a weight indicative of their value in diagnosing the fault. A diagnostic unit receives new error logs associated with abnormal operation or failure of a similar machine, and compares the new error logs to the blocks identified by the training unit. The diagnostic unit uses similarities that it finds between blocks in the new error log and the identified historical blocks to determine a fault diagnosis and suggested solution. The solution receives a score, or similarity index, based on the weights of the blocks.

SUMMARY OF THE INVENTION

It is an object of the present invention to provide improved methods and apparatus for diagnosing faults in a computer system.

It is a further object of some aspects of the present invention to provide methods and apparatus that assist the operator of a computer system in understanding and repairing faults that occur in the system.

It is still a further object of some aspects of the present invention to provide improved methods and apparatus for analysis of an error log generated by a computer system.

In preferred embodiments of the present invention, an error log analyzer (ELA) scans error logs generated by a computer system. The logs are preferably generated whenever the system is running and are analyzed by the ELA at regular intervals and/or when a fault has occurred. The ELA typically comprises a software process running on a node of the computer system. Alternatively, the ELA may comprise dedicated computing hardware.

The ELA processes error log data in three stages:

A selection stage, in which the ELA determines, for each error in the log, whether the error is of relevance to fault conditions of interest. Relevant errors are held for further processing, while irrelevant errors are discarded.

A filtering stage, in which certain errors are composed, i.e., filtered and grouped together, into events, which are known to be associated with particular fault conditions.

An analysis stage, in which the events are checked in order to decide whether their numbers and types are such as to indicate that a fault exists that requires service attention. If so, the problem and, preferably, suggested solutions are reported to a system operator.

At each stage, the ELA processes the errors or events in accordance with predetermined decision criteria. The criteria are expressed in terms of parameters, which are preferably held in suitable tables. Unlike diagnostic systems known in the art, such as expert systems and neural networks, the tables can be edited and updated by development and support personnel, based on field experience with the system and on the particular operating conditions and requirements to which a given system is subjected. The tables can also be copied from one computer system to another. Thus, the present invention provides a tool for fault diagnosis that can be made to identify and offer solutions to an essentially unlimited range of errors appearing in the error log, based on decision criteria that are accessible for adjustment and modification by users in a straightforward manner.

There is therefore provided, in accordance with a preferred embodiment of the present invention, a method for diagnosing faults in a computer-based system, including:

reading a log of errors of different kinds that have been recorded in the system;

selecting from the log errors of those kinds that are relevant to one or more predetermined types of faults that can occur in the system;

filtering the selected errors so as to compose one or more events, each event including one or more occurrences of one or more of the relevant kinds of the errors; and analyzing the composed events to reach an assessment that at least one of the predetermined types of faults has occurred.

Preferably, selecting the errors includes providing a respective callback function for each relevant kind of error, wherein the callback function analyzes data in the error log associated with the error in order to determine whether the error should be selected.

Further preferably, filtering the selected errors includes filtering the errors according to filtering conditions specified in a filtering table, each filtering condition specifying a set of errors required in order to compose one of the events. Most preferably, selecting the errors includes selecting from the log those errors that are known to belong to the set of errors associated with one or more of the filtering conditions. In a preferred embodiment, the set of errors required in order to compose one of the events includes multiple occurrences of one of the kinds of errors or, additionally or alternatively, one or more occurrences of each of a plurality of the kinds of errors. Preferably, the filtering condition specifies a maximum time lapse during which all of the plurality of the errors must occur in order for the condition to be satisfied. Additionally or alternatively, the filtering table further specifies a level of severity for at least some of filtering conditions, and filtering the selected errors includes applying the filtering conditions to the errors in the error list in order of the level of severity of the conditions.

Preferably, filtering the selected errors includes removing errors that have been used in composing one of the events from the error list, whereby any given error is not used to compose more than a single event. Most preferably, removing the errors from the error list includes removing both errors specified as being required to compose a given one of the events and errors specified as being associated with the given one of the events but not required to compose it.

Further preferably, analyzing the composed events includes assigning the events to event sets specified in an event sets table, wherein each event set is associated with at least one of the predetermined types of faults. Most preferably, the event sets table specifies a number of instances of one or more of the events that must occur within a given time frame in order for the event set to be complete, and analyzing the composed events includes reaching an assessment that the type of fault associated with a given one of the event sets has occurred if the event set is complete.

Preferably, analyzing the composed events includes outputting a message to a user with the assessment that one of the predetermined types of faults has occurred with a specified probability that the assessment is correct. In a preferred embodiment, outputting the message includes indicating two or more of the predetermined types of faults that may have occurred, each indicated type with a respective, specified probability. In a further preferred embodiment, outputting the message includes indicating a component of the system that should be replaced. Preferably, reading the log of errors includes reading the error log automatically at predetermined time intervals, and outputting the message includes reporting the assessment to the user automatically, responsive to reaching the assessment that the fault has occurred.

There is also provided, in accordance with a preferred embodiment of the present invention, apparatus for diagnosing faults in a computer-based system, including an error log processor, adapted to read a log of errors of different kinds that have been recorded in the system, to select from the log errors of those kinds that are relevant to one or more predetermined types of faults that can occur in the system, to filter the selected errors so as to compose one or more events, each event including one or more occurrences of one or more of the relevant kinds of the errors, and to analyze the composed events to reach an assessment that at least one of the predetermined types of faults has occurred.

Preferably, the apparatus includes a storage device, in which the log of errors is recorded, wherein the error log processor is coupled to read the log from the storage device substantially automatically. Additionally or alternatively, the apparatus includes a memory, in which the processor stores one or more tables containing conditions according to which the error log is processed. Further additionally or alternatively, the apparatus includes a display, wherein the processor is coupled to output a message to the display with the assessment that one of the predetermined types of faults has occurred along with a specified probability that the assessment is correct.

There is further provided, in accordance with a preferred embodiment of the present invention, a computer program product for diagnosing faults in a computer-based system, the product including a computer-readable medium in which program instructions are stored, which instructions, when read by a computer, cause the computer to read a log of errors of different kinds that have been recorded in the system, to select from the log errors of those kinds that are relevant to one or more predetermined types of faults that can occur in the system, to filter the selected errors so as to compose one or more events, each event including one or more occurrences of one or more of the relevant kinds of the errors, and to analyze the composed events to reach an assessment that at least one of the predetermined types of faults has occurred.

The present invention will be more fully understood from the following detailed description of the preferred embodiments thereof, taken together with the drawings in which:

DETAILED DESCRIPTION OF PREFERRED EMBODIMENTS

Figure 1:
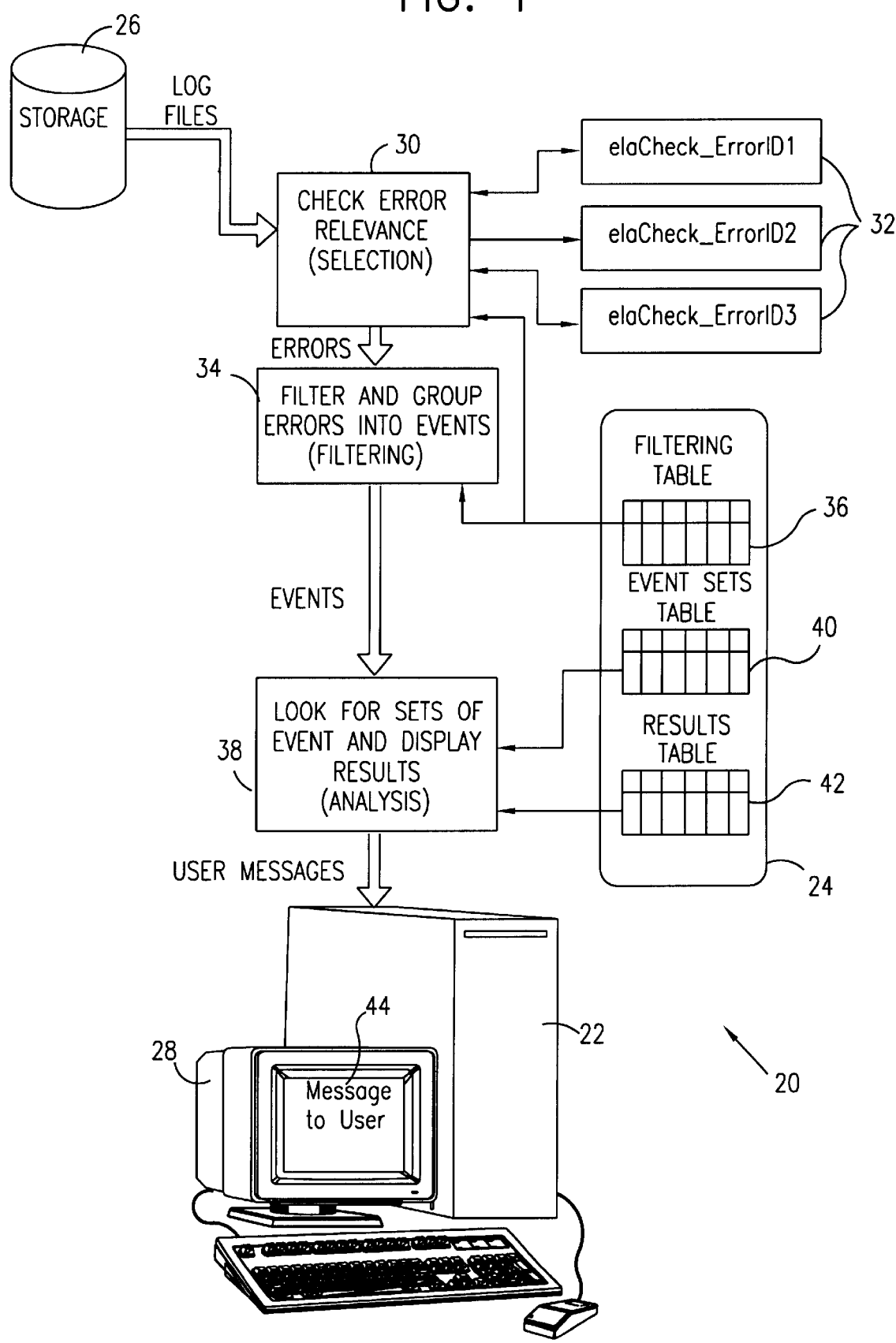
FIG. 1 is a block diagram that schematically illustrates the operation of an error log analyzer (ELA), in accordance with a preferred embodiment of the present invention.

FIG. 1 is a block diagram that schematically illustrates an Error Log Analyzer (ELA) 20, in accordance with a preferred embodiment of the present invention. Typically, the ELA is implemented as a software process on a node of a computer system, such as the IBM RS/6000 SP computer system. The node is linked to a storage device 26, such as a hard disk, and has a memory 24 and a processor 22 with a display 28. The software needed to performed the functions of the ELA, as described hereinbelow, may be provided to processor 22 in electronic form, typically over a network, or it may be provided on tangible media, such as CD-ROM. The ELA may likewise be implemented as a software process in a stand-alone computer or in substantially any computerized system. Alternatively, the ELA may be implemented using a dedicated computer or other dedicated hardware, to which an error log of a system to be diagnosed is input.

ELA 20 analyzes system log files and determines the best course of action for a user (such as a system administrator or field support engineer) to take in order to resolve problems in the system. The ELA first determines whether there is a problem to be fixed and if so, it tells the user what are the most probable actions that should be taken in order to remedy the situation. Preferably, the ELA is invoked periodically, for example, once every 24 hours, as scheduled by an operating system of the computer system. Additionally or alternatively, the ELA is invoked by the operating system when certain types of errors, such as a permanent hardware error, appear in the error log. Further additionally or alternatively, the ELA is invoked by the user when the user becomes aware of a possible fault.

Whenever ELA 20 is invoked, it retrieves and scans error logs stored in storage device 26. It processes data from the error logs in three distinct stages: a selection stage 30, a filtering stage 34 and an analysis stage 38. These processing stages make use of tables that are preferably loaded into memory 24, including a filtering table 36, an event table 40 and a results table 42, which are described in detail hereinbelow.

Selection stage 30 is responsible for extraction of error log data from system error logs and checking each error for relevance by examining the detailed data in the log with respect to filtering table 36. If the error is found to be of interest, based on a list of errors in the filtering table and criteria defined by callback functions 32, it is kept for further processing. One of the criteria considered at this stage, for example, is whether the error was generated by a local failure or a remote one, i.e., an error that happened on a remote node or switch. To a system administrator who is responsible for local system maintenance, remote errors would not generally be of interest. Callback functions 32, such as Perl scripts external to the main ELA program, are preferably used to check each error type (referred to as ErrorID1, ErrorID2, etc.) for relevance. By using these external scripts, the error selection criteria can be easily modified and added to, without recompilation of the ELA. Based on the selection results, stage 30 outputs an error list to filtering stage 34.

Filtering stage 34 is responsible for grouping certain errors together, while filtering other errors out of the process, using filtering table 36. The grouped and filtered errors are composed into events, which are output in an event list.

The reason for grouping the errors at this stage is that under some conditions, errors have a tendency to appear in bursts, as in the case of lightning or someone stepping on a cable. Therefore, it is important to monitor not only the number of errors, but groups of closely-related errors occurring in a common time frame. For example, someone stepping on a cable might generate many errors, but it does not mean that something is damaged. Therefore, if certain types of errors appear in the error log grouped closely together, then they are considered to be a single event. After grouping errors together, the ELA measures the number of recurring groups (or in some cases the number of recurring errors), and generally determines a fault to exist only if a problem persists.

Preferably, the filtering stage can also decide to remove certain errors or groups of errors from the data. This feature is used when certain known system events are known to have occurred. For example, if a message is received stating that a given node in a computer system has been fenced (i.e., disconnected from its switch network), errors logged at around the time of the message are preferably removed. These errors probably were not triggered by a hardware malfunction, but rather by the action that was taken in fencing the node.

Analysis stage 38 is responsible for taking the filtered data in the event list from filtering stage 34 and deciding whether a fault has occurred, as well as giving supplemental information to the user. In this stage, the ELA typically checks the number of events generated of a certain, specified type or types. If the number is beyond a preset threshold, a problem is reported. Additional conditions may be attached to the events. For example, a transient error in a switch adapter might be considered acceptable from time to time due to network overload, but if this event appears more than 50 times in 24 hours, then a fault is reported.

Analysis stage 38 diagnoses device problems using event sets, stored in event sets table 40. An event set is a list containing event identifiers and the minimum number of events needed for an associated fault condition to be found true. For each event set, a time frame is also specified. If all of the events in the set appear in the error log within the specified time frame, in larger numbers than specified minimum values, the fault condition associated with the event set is found to be true. For example, one such condition might be the appearance of two error types (A and B) in the same time frame in certain numbers, say at least ten occurrences of error A and at least one occurrence of error B within 15 minutes. In this case, even 20 events of type A, without a single event of type B, would not lead the ELA to report a problem.

If the condition indicated by a particular event set are found to be true, the ELA reads the corresponding result from results table 42. The result is shown, preferably on display 28, as a message 44 to the computer user. It may occur that multiple conditions are true, indicating multiple possible faults, or that a single event set is indicative of a number of possible different faults. In such cases, all of the possible fault results are preferably displayed. In addition, if the fault can be cured by replacement of a field-replaceable unit (FRU), then the message to the user preferably also includes an identification of the FRU.

Tables 36, 40 and 42 are typically filled in and "fine-tuned" by product development and technical support personnel. For example, a field engineer who is aware that a given device is operating under strenuous conditions, which cause the device to generate more frequent occurrences of a certain event than in normal operation, might edit the tables to increase the threshold value for that event. Increasing the threshold will eliminate possible inaccurate reports that the device is malfunctioning. On the other hand if the field engineer notices certain errors that slip by the ELA, he or she can decrease the threshold value for that corresponding event. However, most parameters used for filtering and analysis have defaults that are used when no other value has been specified.

Figure 2:
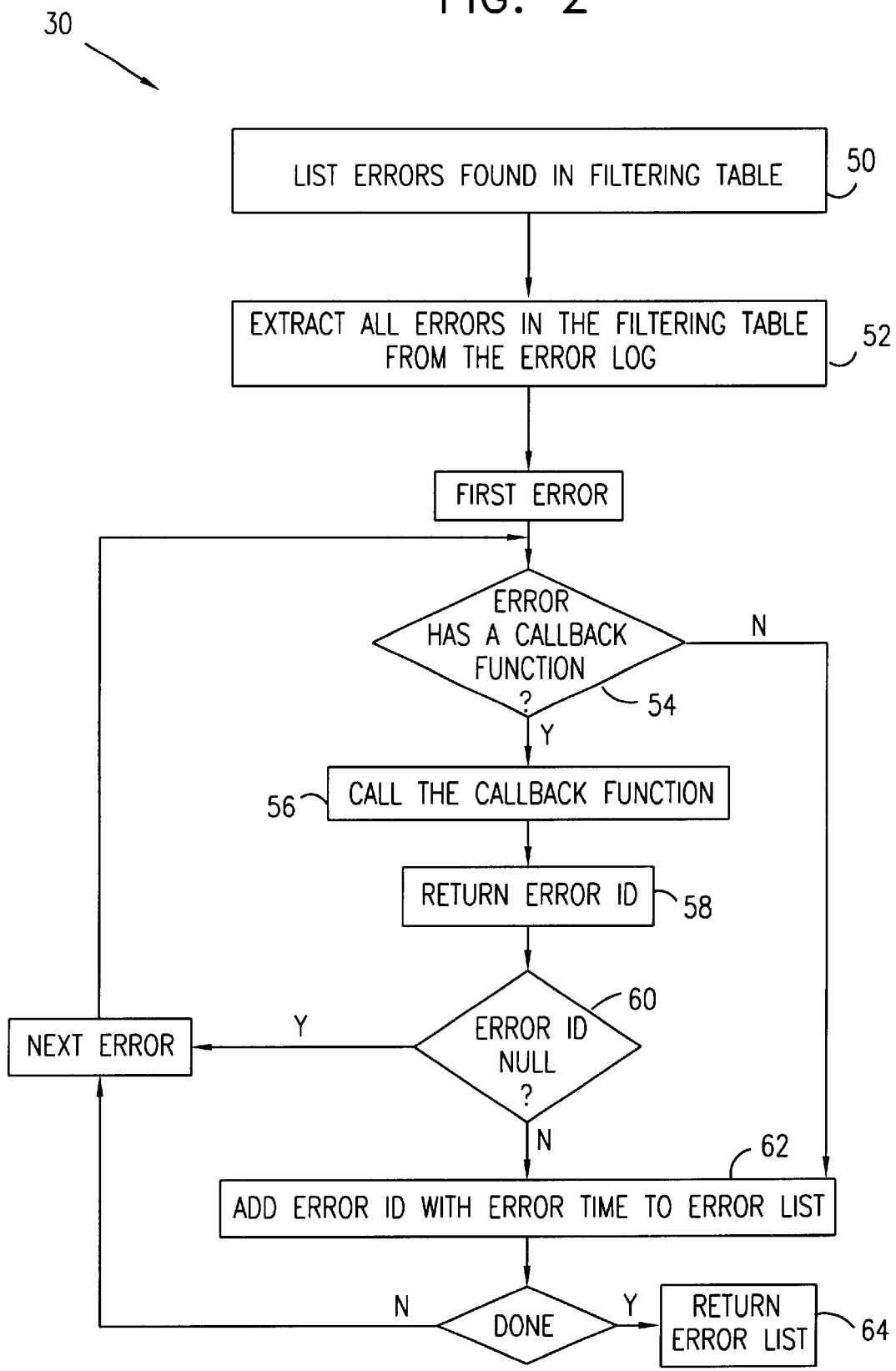
FIG. 2 is a flow chart that schematically illustrates an error selection stage of processing performed by the ELA of FIG. 1, in accordance with a preferred embodiment of the present invention.

FIG. 2 is a flow chart that schematically illustrates details of selection stage 30, in accordance with a preferred embodiment of the present invention. At an error list step 50, the ELA parses filtering table 36 (whose structure and content are described in greater detail hereinbelow, with reference to Table I), in order to generate a list of errors that may be relevant to the current error log analysis. Errors that do not appear in the predicate of any of the conditions in the filtering table are irrelevant for this purpose, and are therefore preferably discarded. At an extraction step 52, the ELA goes over the errors in the error log that occurred in the last 24 hours or over some other specified period. The errors that appear in the filtering table are extracted for subsequent processing.

Callback functions 32 (FIG. 1) examine detailed data carried by the corresponding error entries in the log to determine whether the error is relevant and needs to be examined further. Thus at a check callback step 54, the ELA determines for each error received from step 52 whether there is a corresponding callback function 32. If not, the error is passed on without further processing at this stage. At a callback step 56, the appropriate callback function is called. At a return step 58, the callback returns an identifier, or ErrorID, for the particular error. If the error is not relevant the callback returns NULL, and the error is discarded at a null error step 60. Otherwise, at an add step 62, the ErrorID, together with the time of occurrence of the error, is added to the error list. When the selection stage is done, the error list is output to filtering stage 34, at a return list step 64.

The callback can also return a new ErrorID specifying a special condition newly detected. This feature can be used, for example, to subtype error log entries into new errors, giving a more accurate fault description and finer distinctions between different error types. The new ErrorID should be properly addressed in filtering table 36 and in event sets table 40. After the errors are processed using this mechanism, the ELA continues to filter the data using the filtering table.

Table I below shows the structure of filtering table 36, in accordance with a preferred embodiment of the present invention. Table I also includes a number of illustrative examples of filtering conditions, or criteria, that could be included in such a table. Each line in the table represents one such criterion, characterized by five fields: Required Error IDs, Optional Error IDs, Maximum Time Lapse, Maximum Errors, Severity, and Event ID. The significance and contents of these fields are described in the text following the table.

TABLE I

FILTERING TABLE

| Required Error IDs | Optional Error IDs | Event ID | Severity | Maximum Time Lapse | Maximum Errors |
|---|---|---|---|---|---|
| Examples: | | | | | |
| 1. Each error of type A is transformed into a separate event. | | | | | |
| Error_A | — | Event_A | — | — | — |
| 2. All errors of type B are transformed into only a single event. | | | | | |
| Error_B | — | Event_B | — | I | — |
| 3. Every 30 consecutive errors of type C which are no more than 10 seconds apart become one event. | | | | | |
| Error_C | — | Event_C | — | 10 sec | 30 |
| 4. When errors of type Link_Error and CRC_Error are encountered no more than 15 seconds apart, they are transformed into a Coin_Adapter_Event. Errors of type Packet_Resend_Error are a by- product and will also be part o the created event. No more than 100 errors can fit into one event, so that if necessary more than one event will be created. Due to the low severity of this filtering condition, it will be processed after most other filtering conditions. | | | | | |
| Link Error, CRC_Error | Error r_Event | 7 | 15 sec | 100 |
| 5. When an error of type Node_Shutdown is logged, all errors of type Daemon_Killed_Error and Link_Error found in the vicinity (not more than 30 seconds apart) are filtered out of further ELA processing. Due to the high severity of this filtering condition, it will be the first to be processed. Thus, Link_Error errors removed here will not be used for filtering condition no. 4, above. | | | | | |
| Node_Shutdown Error, Link_Error | — | 1 | 30 sec | — |

The fields in Table I are in follows:

The Event ID field specifies the identifier of the event that will be formed if the criteria in the corresponding table entry are met. If the Event ID field is left empty, the selected group of errors is filtered out, and is not passed to analysis stage 38. Otherwise, the Event ID field requires a unique value for each table entry.

The Required Error IDs field lists the errors that must be present for the event to be formed. The required errors are those errors needed to identify the event.

The Optional Errors IDs field lists the errors that, if present, will also be considered as part of the event. The optional errors are collected into an already-identified event. The event will be formed even in their absence. Inclusion of the optional errors in the event, however, will stop them from being transformed into other events.

The Maximum Time Lapse field specifies the maximum time, in seconds, that will cause two successive errors to be considered as part of the same event. Infinity can be specified by "I".

The Maximum Errors field specifies the largest number of errors that can be transformed into a single event. Errors in excess of this number will be held for possible formation of a subsequent event.

The Severity field defines the order in which the filtering conditions should be applied (allowed values: 0–10). The lines with the lowest severity value are applied first. Lines with the same severity value are applied in order from the first table entry to the last table entry. Lines with no severity value are preferably considered as having severity 5.

The log file is analyzed from the oldest to the newest error. Every error that is added to an event is removed from the log, so that no error can be part of two events. This means that events should be listed in the filtering table, with the appropriate severity, according to the order in which they are to be processed.

Figure 3:
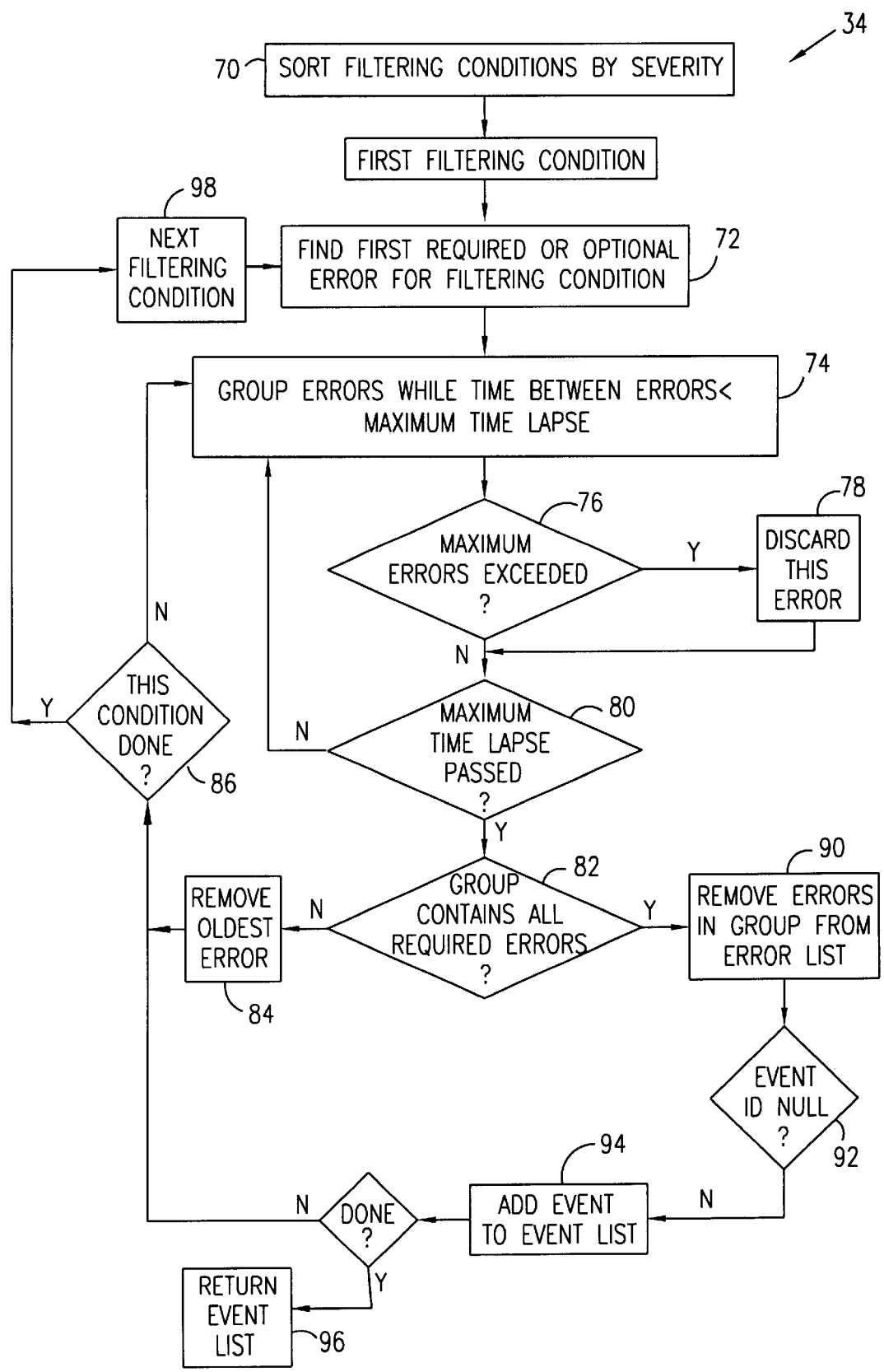
FIG. 3 is a flow chart that schematically illustrates a filtering stage of processing performed by the ELA of FIG. 1, in accordance with a preferred embodiment of the present invention.

FIG. 3 is a flow chart that schematically illustrates details of filtering stage 34, in accordance with a preferred embodiment of the present invention. At a sorting step 70, the entries in filtering table 36 are sorted by severity. The sorted filtering conditions are then processed in turn, in order of their severity and of their appearance in the table. For each of the conditions, the ELA scans the error list received from selection stage 30 to find the first instance of one of the required or optional error IDs associated with the condition, at an error finding step 72. The ELA then continues to scan the error list for other required or optional errors associated with the condition under consideration. The errors found in this manner are grouped together into the single event specified by the condition, at an error grouping step 74. (If the event can contain only a single error, such as in Example 1 in the table above, step 74 and subsequent steps are skipped, and the process continues at an error removal step 90, as described hereinbelow.) Grouping of the errors in step 74 continues as long as no more than the specified Maximum Time Lapse has passed in the error log between the error instance and the current one.

Whenever a new error is added to the event, the ELA checks to determine whether the cumulative number of errors has exceeded the Maximum Errors criterion for this filtering condition, at a maximum errors step 76. Any errors in excess of the maximum are returned to the error list, at an error discard step 78. At a time lapse step 80, the ELA determines whether the specified Maximum Time Lapse has passed between the time of the current error and the previous one. If the maximum time has lapsed, the ELA then checks, at a check all errors step 82, whether the group contains all of the Required Errors specified for this condition in the filtering table. Optional errors are not taken into account at this step.

If it is determined at step 82 that not all of the required errors have been accumulated in the group, the oldest error in the group is removed from the group, at an error removal step 84. The ELA then checks, at a condition done step 86, whether there are any later errors on the error list relevant to the current filtering condition. If so, the filtering process for this filtering condition continues back at step 74. If the relevant errors have been exhausted, however, the next filtering condition (in the order established at step 70) is selected at a next condition step 98. Processing of this next condition begins, as it did for the preceding condition, at step 72.

On the other hand, if at step 82 the group is found to be complete, then all of the errors in the group, including both the required and the optional errors, are removed from the error list, at an error removal step 90. If the corresponding Event ID for this entry is null, then the event is discarded, at a null event check step 92. Otherwise, at an add event step 94, the event is added to the event list for output to analysis stage 38. As long as there are further errors in the error list and conditions in the filtering table to be checked, stage 34 loops back through step 86, as described above. When filtering stage 34 is completed, the procedure of FIG. 3 terminates and passes the event list to analysis stage 38, at a return event list step 96.

Table II below is a pseudocode listing, providing details of implementation of the method carried out in filtering stage 34, in accordance with a preferred embodiment of the present invention. The method uses a queue, named Event_Q, to hold the errors (Err) read from the error list. A set named Req is used to hold the required errors for each current filtering condition Fc.

TABLE II

```
sort the Filtering Conditions by Severity
for each Filtering Condition (Fc) in the filtering table
do
    {
        Event_found <- FALSE
        Event_Q <- empty
        Req <- empty
        for each error (Err) in the Error_List do
        {
            if Err is required or Err is optional in Fc then
            {
                if Event_Q not empty then
                {
                    Last_Err <- Event_Q.back( )
                    if the time that passed between Err and
                        Last_Err is bigger than the Max_Time_Lapse
                        field of the Fc then
                    {
                        if Event_Found is TRUE then
                        {
                            remove all errors found in Event_Q
                                from Error_List
                            Event_Time <- Event_Q.pop( ).Time
                            Event_Found <- FALSE
                            if the Event_ID in the Fc is not
                                NULL then add the Event_ID to
                                Event_List with Event_Time
                        }
                        Event_Q <- empty
                        Req <- empty
                    }
                    else
                    {
                        if the number of items in Event_Q is
                            higher than the Maximum_Errors field
                            of the Fc then
```

TABLE II-continued

```
                        {
                            if Event_Found is TRUE then
                            {
                                remove all errors found in
                                    Event_Q from Error_List
                                Event_Time <- Event_Q.pop( ).Time
                                Event_Q.empty( )
                                Req <- empty
                                Event_Found <- FALSE
                                if the Event_ID in the Fc is not
                                    NULL then add the Event_ID to
                                    Event_List with Event_Time
                            }
                            else
                            {
                                ErrX <- Event_Q.pop( )
                                if ErrX is required in Fc then
                                    remove ErrX from Req
                            }
                        }
                    }
                }
                Event_Q.push(Err)
                if Err is required in Fc then
                    Req <- Req + Err
                if Req contains all the required errors in Fc
                    then
                    Event_Found <- TRUE
            }
        }
    }
}
```

Table III below illustrates the form of entries in events set table 40, used in analysis stage 38, in accordance with a preferred embodiment of the present invention. Some illustrative examples follow the table, together with an explanation of the meaning and syntax of the fields in the events set table.

TABLE III

EVENT SETS TABLE

EventID, EventCount; . . . ; EventID, EventCount; TimeFrame = M (minutes); MinEvents = N; Result = Result_Num, Probability; Title = Title_Num; Severity = S
EventID, EventCount; . . . ; EventID, EventCount; TimeFrame = M (minutes); MinEvents = N; Result = Result_Num, Probability; Title = Title_Num; Severity = S
EventID, EventCount; . . . ; EventID, EventCount; TimeFrame = M (minutes); MinEvents = N; Result = Result_Num, Probability; Title = Title_Num; Severity = S
.
.
.

EXAMPLES

1. Event_B, 1; Result=1, 100; Title=100

One event of type B is enough to indicate that a problem, identified as problem no. 100 (the problem title to be displayed in user message 44). The diagnosis, with 100% certainty, is result no. 1, as listed in results table 42.

2. Event_A, 30; TimeFrame=180; Title=101; Result=3, 60; Result=4, 30; Result=1, 10

At least 30 events of type A within three hours (180 minutes) indicate that there is a problem, identified as problem no. 101. The correct diagnosis, possibly including the action that the user should perform, is result no. 3 (in the results table) with a certainty of 60%. Alternatively, the diagnosis may be result no. 4 with a certainty of 30%, or lastly result no. 1 with a certainty of 10%.

3. Event_A, 1; Event_C, 10; Com_Adapter_Error, 3; TimeFrame=30; Severity=2; Title=102; Result=5, 90; Result=1, 10

When at least ten events of type C, three events of type Com_Adapter_Error, and one event of type A are present within 30 minutes, problem no. 102 is identified, and result no. 5 is diagnosed with a 90% certainty. The alternative result no. 1 has 10% certainty. The severity of this event set is high, and it will therefore be analyzed before the other event sets above.

Every line in event sets table 40 specifies an event condition, referred to as an event set. If a condition is fully met, it means that a problem has been detected and a recommendation will be displayed in user message 44. Each event set is composed of a list of events, identified by the corresponding Event IDs in the event list output from filtering stage 34, with a minimum Event Count value for each event. Also detailed for each event set is a Time Frame parameter, which specifies the time frame (in minutes) within which all of the events in the event set must happen. If the Time Frame parameter is not specified, it defaults to 24 hours. If all the events in the event set appear within the specified Time Frame, in at least the numbers given by the respective Event Count values, then the condition is met.

A Min Events parameter, N, can be specified in each line of table 40. This causes the condition to be true if at least N of the event types making up the event set have appeared in the event list in at least the numbers of instances specified by their respective Event Count values within the specified Time Frame. (In other words, if N is less than the number of different event types making up the event set, then it is not necessary that all of the events in the event set actually occur in the specified numbers in order for the corresponding condition to be satisfied.) If the Min Events parameter is not specified, all of the events must appear in the event list in at least the numbers specified by their Event Count values.

Each event set can also have one or more Result parameters, which specify the diagnosis to display to the user and the probability associated with that diagnosis. The Result_Num value is the number of the corresponding entry in results table 42, which typically also includes corrective action that the user should take. The Probability value is the probability (in percent) that this is the result that has actually happened under the conditions of the event set. If not specified, the default Result is the first entry in the results table (which should preferably be "device faulty"), with a probability of 100%. A Title parameter can be used to specify the title for the recommendation.

Another optional parameter is the Severity parameter (possible values: 0–10). This parameter defines the order in which the event sets are to be checked, like the severity parameter in filtering table 36. The event sets with the lowest Severity value are checked first, while event sets with the same Severity value are checked in order of their appearance in the table. Events sets with no Severity value default to Severity 5.

Each Event Set that is found to be true is looked up in results table 42. If it is specified in the results table that this Result requires a FRU call (Field Replaceable Unit—used to identify damaged devices), this information is displayed in user message 44. Table IV below illustrates the structure and content of the results table, in accordance with a preferred embodiment of the present invention. The table includes three columns: the entry number (i.e., the corresponding Result_Num), the number of the message to be displayed to the user, and a Boolean value answering whether a FRU should be reported. The strings corresponding to the message numbers are preferably kept in a separate message catalog, so that user message 44 can be presented in an appropriate national language.

TABLE IV

RESULTS TABLE

| Result Number | Message Number (in catalog file) | Report FRU? |
|---|---|---|
| Examples: | | |
| R1 | 10 | 1 |
| R2 | 11 | 0 |

CATALOG FILE EXAMPLES

10 "The Communication Adapter is damaged and needs to be replaced."

11 "The /var file system is full, cannot write error log file."

Figure 4:
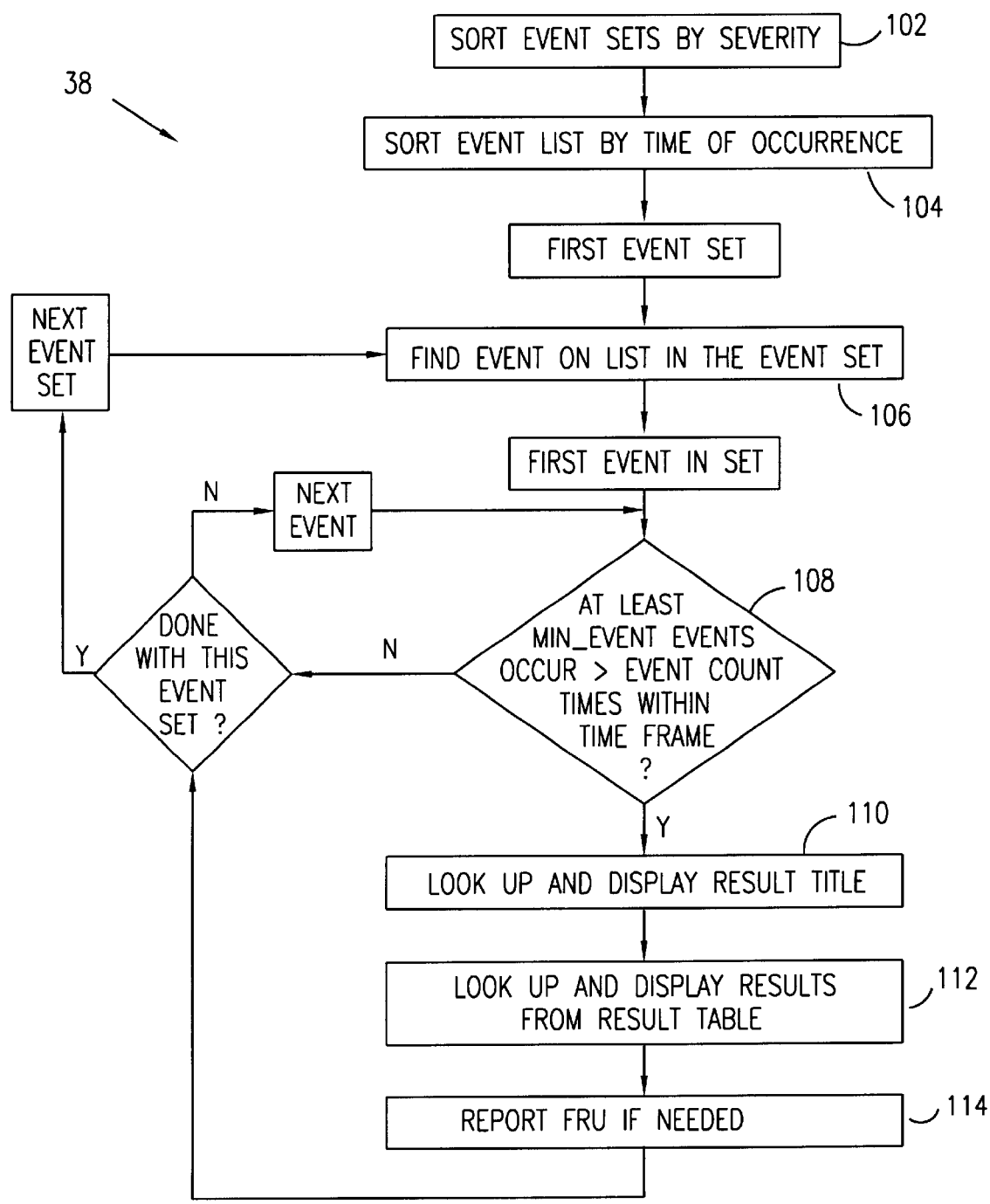
FIG. 4 is a flow chart that schematically illustrates an analysis stage of processing performed by the ELA of FIG. 1, in accordance with a preferred embodiment of the present invention.

FIG. 4 is a flow chart that schematically illustrates details of analysis stage 38, in accordance with a preferred embodiment of the present invention. At an event sets sorting step 102, the event sets in event sets table 40 are sorted by severity, so that event sets with lower severity values will be processed before those with higher severity values. At an event list sorting step 104, the events in the event list passed by stage 34 are sorted by the order in which they occurred. Processing of the event sets and of the events then takes place in the sorted order.

For each of the event sets, the event list is scanned, at a find events step 106, to find events that belong to this event set. For each of the events that is found in this step, the ELA checks, at an event evaluation step 108, to determine whether all of the necessary events have occurred in the required numbers within the specified time frame for this event set, using the parameters from the corresponding entry in table 40. As noted above, if a Min_Event value, N, is specified for the particular event set, then only N of the different event types in the set need have occurred in their required numbers in order for step 108 to return a "true" value. As long as step 108 returns "false," the ELA continues to cycle through the events in the event list belonging to this event set. When all of the events in the event list have been considered, the process goes on to the next event set in table 40, continuing until all of the event sets have been reviewed.

When step 108 does return "true," the ELA continues at a title look-up step 110, to look up and display user message 44 with the appropriate title, as specified in the event sets table. At a results look-up step 112, the results corresponding to this event set are retrieved from results table 42. These results are also displayed in user message 44, with the specified probabilities. Finally, if the results table specifies a FRU, then the appropriate FRU is added to the user message, at a FRU report step 114. The events in this event set are removed from the event list. The ELA then continues processing the remaining events in the event list to find further occurrences of this event set or, after the entire event list has been reviewed, goes on to the next event set in table 40.

Preferably, the ELA keeps a record of recommendations it has made in past user messages 44. These past recommendations can be recalled when an event set or result recurs, in order to alert the user to fault patterns and to earlier recommendations that the user has or has not followed. Further preferably, the ELA maintains a history file containing the logical steps that led it to a given conclusion, so that the user can review and understand the analysis that was involved.

Table V below is a pseudocode listing showing implementation details of the method carried out in analysis stage 38, in accordance with a preferred embodiment of the present invention. The method uses a queue, named EvSet_Q, to hold the events (Ev) read from the event list. Two arrays named EvArr and EvArr_Bak are used to hold the events belonging to the current event set EvSet.

TABLE V

```
sort the Event Sets by Severity
sort the Event_List by time
    for each Event Set (EvSet) in the Event Sets Table do
    {
        if TimeFrame not specified in EvSet
            TimeFrame <- 24 hours
        if MinEvents not specified in EvSet
            MinEvents <- number of conditions in EvSet
        EvSet_Q <- empty
        build an array (EvArr) containing an entry for each
            Event ID in EvSet and its needed Event Count
        EvArr_Bak <- EvArr
        for each event (Ev) in Event_List do
        {
        if Ev is part of EvArr then
        {
            if EvSet_Q not empty then
            {
                First_Ev <- EvSet_Q.front( )
                while the time between First_Ev and Ev
                    is larger than TimeFrame do
                {
                    EvX <- EvSet_Q.pop( )
                    EvArr[EvX] <- min(EvArr_Bak[EvX],
                        EvArr[EvX] + 1)
                    // peek at the next item but don't
                        take it out of the queue
                    First_Ev <-
                        EvSet_Q.front( )
                }
            }
            EvSet_Q.push(Ev)
            EvArr[Ev] <- max(0, EvArr[Ev] - 1)
            if at least MinEvents entries in EvArr are
            equal to 0
                go to the entry specified by Result
                in the Results Table, display message
                to user and return FRU if necessary
        }
        }
    }
}
```

It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for diagnosing faults in a computer-based system, comprising:

reading a log of errors of different kinds that have been recorded in the system;

selecting from the log errors of those kinds that are relevant to one or more predetermined types of faults that can occur in the system;

filtering the selected errors so as to compose one or more events, each event comprising one or more occurrences within a predetermined time frame of one or more of the relevant kinds of the errors; and analyzing the composed events to reach an assessment that at least one of the predetermined types of faults has occurred.

2. A method according to claim 1, wherein selecting the errors comprises providing a respective callback function for each relevant kind of error, wherein the callback function analyzes data in the error log associated with the error in order to determine whether the error should be selected.

3. A method according to claim 1, wherein filtering the selected errors comprises filtering the errors according to filtering conditions specified in a filtering table, each filtering condition specifying a set of errors required in order to compose one of the events.

4. A method according to claim 3, wherein selecting the errors comprises selecting from the log those errors that are known to belong to the set of errors associated with one or more of the filtering conditions.

5. A method according to claim 3, wherein the set of errors required in order to compose one of the events comprises multiple occurrences of one of the kinds of errors.

6. A method according to claim 3, wherein the set of errors required in order to compose one of the events comprises one or more occurrences of each of a plurality of the kinds of errors.

7. A method according to claim 3, wherein the filtering table further specifies a level of severity for at least some of filtering conditions, and wherein filtering the selected errors comprises applying the filtering conditions to the errors in the error list in order of the level of severity of the conditions.

8. A method according to claim 1, wherein analyzing the composed events comprises assigning the events to event sets specified in an event sets table, wherein each event set is associated with at least one of the predetermined types of faults.

9. A method according to claim 1, wherein analyzing the composed events comprises outputting a message to a user with the assessment that one of the predetermined types of faults has occurred with a specified probability that the assessment is correct.

10. A method according to claim 9, wherein outputting the message comprises indicating a component of the system that should be replaced.

11. A method for diagnosing faults in a computer-based system, comprising:

reading a log of errors of different kinds that have been recorded in the system;

selecting from the log errors of those kinds that are relevant to one or more predetermined types of faults that can occur in the system;

filtering the selected errors so as to compose one or more events, each event comprising one or more occurrences of one or more of the relevant kinds of the errors; and analyzing the composed events to reach an assessment that at least one of the predetermined types of faults has occurred, wherein filtering the selected errors comprises filtering the errors according to filtering conditions specified in a filtering table, each filtering condition specifying a set of errors required in order to compose one of the events, and wherein the set of errors comprises a plurality of the errors, and wherein the filtering condition specifies a maximum time lapse during which all of the plurality of the errors must occur in order for the condition to be satisfied.

12. A method for diagnosing faults in a computer-based system, comprising:

reading a log of errors of different kinds that have been recorded in the system;

selecting from the log errors of those kinds that are relevant to one or more predetermined types of faults that can occur in the system;

filtering the selected errors so as to compose one or more events, each event comprising one or more occurrences of one or more of the relevant kinds of the errors; and analyzing the composed events to reach an assessment that at least one of the predetermined types of faults has occurred, wherein filtering the selected errors comprises removing errors that have been used in composing one of the events from the error list, whereby any given error is not used to compose more than a single event.

13. A method according to claim 12, wherein removing the errors from the error list comprises removing both errors specified as being required to compose a given one of the events and errors specified as being associated with the given one of the events but not required to compose it.

14. A method for diagnosing faults in a computer-based system, comprising:

reading a log of errors of different kinds that have been recorded in the system;

selecting from the log errors of those kinds that are relevant to one or more predetermined types of faults that can occur in the system;

filtering the selected errors so as to compose one or more events, each event comprising one or more occurrences of one or more of the relevant kinds of the errors; and analyzing the composed events to reach an assessment that at least one of the predetermined types of faults has occurred, wherein analyzing the composed events comprises assigning the events to event sets specified in an event sets table, wherein each event set is associated with at least one of the predetermined types of faults, and wherein the event sets table specifies a number of instances of one or more of the events that must occur within a given time frame in order for the event set to be complete, and wherein analyzing the composed events comprises reaching an assessment that the type of fault associated with a given one of the event sets has occurred if the event set is complete.

15. A method for diagnosing faults in a computer-based system, comprising:

reading a log of errors of different kinds that have been recorded in the system;

selecting from the log errors of those kinds that are relevant to one or more predetermined types of faults that can occur in the system;

filtering the selected errors so as to compose one or more events, each event comprising one or more occurrences of one or more of the relevant kinds of the errors; and analyzing the composed events to reach an assessment that at least one of the predetermined types of faults has occurred, wherein analyzing the composed events comprises outputting a message to a user with the assessment that one of the predetermined types of faults has occurred with a specified probability that the assessment is correct, and wherein outputting the message comprises indicating two or more of the predetermined types of faults that may have occurred, each indicated type with a respective, specified probability.

16. A method for diagnosing faults in a computer-based system, comprising:

reading a log of errors of different kinds that have been recorded in the system;

selecting from the log errors of those kinds that are relevant to one or more predetermined types of faults that can occur in the system;

filtering the selected errors so as to compose one or more events, each event comprising one or more occurrences of one or more of the relevant kinds of the errors; and analyzing the composed events to reach an assessment that at least one of the predetermined types of faults has occurred, wherein analyzing the composed events comprises outputting a message to a user with the assessment that one of the predetermined types of faults has occurred with a specified probability that the assessment is correct, and wherein reading the log of errors comprises reading the error log automatically at predetermined time intervals, and wherein outputting the message comprises reporting the assessment to the user automatically, responsive to reaching the assessment that the fault has occurred.

17. Apparatus for diagnosing faults in a computer-based system, comprising an error log processor, adapted to read a log of errors of different kinds that have been recorded in the system, to select from the log errors of those kinds that are relevant to one or more predetermined types of faults that can occur in the system, to filter the selected errors so as to compose one or more events, each event comprising one or more occurrences within a predetermined time frame of one or more of the relevant kinds of the errors, and to analyze the composed events to reach an assessment that at least one of the predetermined types of faults has occurred.

18. Apparatus according to claim 17, and comprising a storage device, in which the log of errors is recorded, wherein the error log processor is coupled to read the log from the storage device substantially automatically.

19. Apparatus according to claim 17, and comprising a memory, in which the processor stores one or more tables containing conditions according to which the error log is processed.

20. Apparatus according to claim 17, and comprising a display, wherein the processor is coupled to output a message to the display with the assessment that one of the predetermined types of faults has occurred along with a specified probability that the assessment is correct.

21. A computer program product for diagnosing faults in a computer-based system, the product comprising a computer-readable medium in which program instructions are stored, which instructions, when read by a computer, cause the computer to read a log of errors of different kinds that have been recorded in the system, to select from the log errors of those kinds that are relevant to one or more predetermined types of faults that can occur in the system, to filter the selected errors so as to compose one or more events, each event comprising one or more occurrences within a predetermined time frame of one or more of the relevant kinds of the errors, and to analyze the composed events to reach an assessment that at least one of the predetermined types of faults has occurred.

22. A product according to claim 21, the instructions further cause the computer to select the errors by calling a respective callback function for each relevant kind of error, wherein the callback function analyzes data in the error log associated with the error.

23. A product according to claim 21, wherein the instructions cause the computer to filter the errors according to filtering conditions specified in a filtering table, each filtering condition specifying a set of errors required in order to compose one of the events, and to analyze the events by assigning the events to event sets specified in an event sets table, wherein each event set is associated with at least one of the predetermined types of faults.

24. A product according to claim 21, wherein the instructions further cause the computer to output a message to a user with the assessment that one of the predetermined types of faults has occurred with a specified probability that the assessment is correct.

* * * * *